(12) United States Patent
Munteanu et al.

(10) Patent No.: US 8,416,425 B2
(45) Date of Patent: Apr. 9, 2013

(54) INTERFEROMETRIC MEASUREMENT OF NON-HOMOGENEOUS MULTI-MATERIAL SURFACES

(75) Inventors: Florin Munteanu, Tucson, AZ (US); Dong Chen, Tucson, AZ (US); Erik Novak, Tucson, AZ (US); G. Lawrence Best, Tucson, AZ (US)

(73) Assignee: Bruker Nano Inc., Santa Barbara, CA (US)

( * ) Notice: Subject to any disclaimer, the term of this patent is extended or adjusted under 35 U.S.C. 154(b) by 0 days.

(21) Appl. No.: 13/528,786

(22) Filed: Jun. 20, 2012

(65) Prior Publication Data

US 2012/0257215 A1    Oct. 11, 2012

Related U.S. Application Data

(62) Division of application No. 11/824,127, filed on Jun. 29, 2007, now Pat. No. 8,213,021.

(51) Int. Cl.
*G01B 11/02* (2006.01)
(52) U.S. Cl. .................................................. 356/511
(58) Field of Classification Search .................. 356/497, 356/507, 511
See application file for complete search history.

(56) References Cited

U.S. PATENT DOCUMENTS

| | | | | |
|---|---|---|---|---|
| 5,432,606 | A * | 7/1995 | Noguchi et al. | 356/514 |
| 6,633,831 | B2 * | 10/2003 | Nikoonahad et al. | 702/155 |
| 7,307,734 | B2 * | 12/2007 | Dogariu | 356/497 |
| 8,213,021 | B2 * | 7/2012 | Chen et al. | 356/511 |
| 2006/0176522 | A1 | 8/2006 | Mansfield et al. | |

OTHER PUBLICATIONS

K.H. Womack et al., "IEEE Transactions on Magnetics" vol. 34, No. 2 Mar. 1998. p. 459.
Peter deGroot, "Applied Optics," vol. 37. No. 28. Oct. 1998. p. 6654.

* cited by examiner

*Primary Examiner* — Michael A Lyons
(74) *Attorney, Agent, or Firm* — Antonio R. Durando

(57) ABSTRACT

Correction factors for the ALR and PTR parameters of magnetic-head sliders are determined by calculating an effective reflectivity and a corresponding PCOR at each pixel of the air-bearing surface. The absolute value of reflectivity at each pixel of the AlTiC air-bearing surface is obtained from an empirical equation relating it to modulation. The ratio of $Al_2O_3$ and TiC in the AlTiC surface is then calculated at every pixel assuming a linear relationship between the absolute value of AlTiC reflectivity and the theoretical reflectivity of each constituent. The linear relationship is then also used to calculate the effective (complex) reflectivity for the AlTiC material from the relative concentrations of $Al_2O_3$ and TiC at each pixel.

5 Claims, 6 Drawing Sheets

MEASURE THE INTERFERENCE SIGNALS PRODUCED BY A COMPOSITE SAMPLE AND DETERMINE A CORRESPONDING HEIGHT AT A PLURALITY OF PIXELS

↓

CALCULATE AN EFFECTIVE VALUE OF AN OPTICAL PROPERTY OF THE COMPOSITE MATERIAL AT EACH PIXEL BASED ON THE INTERFERENCE SIGNAL MEASURED AT EACH OF SAID PLURALITY OF PIXELS

↓

CORRECT THE HEIGHT AT EACH OF THE PLURALITY OF PIXELS USING THE EFFECTIVE VALUE OF THE OPTICAL PROPERTY CALCULATED FOR EACH PIXEL

FIG. 3

MEASURE THE INTERFERENCE SIGNALS PRODUCED BY A COMPOSITE
SAMPLE AND DETERMINE A CORRESPONDING INITIAL HEIGHT AT A
PLURALITY OF PIXELS

↓

ASSUME AN EMPIRICAL RELATIONSHIP BETWEEN THE ABSOLUTE VALUE
OF REFLECTIVITY FOR A MATERIAL AND AN INTERFERENCE SIGNAL
PRODUCED BY THE MATERIAL

↓

ESTABLISH SAID EMPIRICAL RELATIONSHIP USING INTERFERENCE
DATA PRODUCED BY MATERIALS WITH KNOWN VALUES OF
REFLECTIVITY

↓

USE THE EMPIRICAL RELATIONSHIP TO DERIVE AN ABSOLUTE VALUE
OF REFLECTIVITY FOR THE COMPOSITE SAMPLE

↓

ASSUME A LINEAR RELATIONSHIP BETWEEN A CONCENTRATION OF
EACH CONSTITUENT OF THE COMPOSITE SAMPLE AND A CONTRIBUTION
OF SAID CONSTITUENT TO THE REFLECTIVITY OF THE COMPOSITE
SAMPLE

↓

USE THE LINEAR RELATIONSHIP TO CALCULATE THE CONCENTRATION
OF EACH CONSTITUENT

↓

DERIVE AN EFFECTIVE VALUE OF REFLECTIVITY FOR THE COMPOSITE
SAMPLE FROM THE LINEAR RELATIONSHIP AND THE CONCENTRATION
OF EACH CONSTITUENT

↓

CALCULATE A PHASE CHANGE ON REFLECTION AT EACH PIXEL BASED
ON THE EFFECTIVE VALUE OF REFLECTIVITY OF THE COMPOSITE
SAMPLE AT THAT PIXEL

↓

ADD A CORRESPONDING FRACTION OF A WAVELENGTH TO THE INITIAL
HEIGHT OF EACH OF THE PLURALITY OF PIXELS

FIG. 4

INTERFEROMETRIC MEASUREMENT OF NON-HOMOGENEOUS MULTI-MATERIAL SURFACES

REFERENCE TO RELATED APPLICATIONS

This application is a divisional application of Ser. No. 11/824,127, filed Jun. 29, 2007.

BACKGROUND OF THE INVENTION

1. Field of the Invention

This invention relates in general to interferometric techniques for surface characterization. In particular, it relates to a new approach for measuring the height profile of a sample having an optically non-homogeneous surface resulting from a composite multi-material structure.

2. Description of the Related Art

Interferometric profilometry enables the performance of non-contact measurements of surfaces with high resolution and at high measurement speeds. Accordingly, several widely accepted techniques have been developed in the art for calculating surface topography from optical interference data recovered from two conventional approaches, namely phase-shifting interferometry (PSI) and vertical-scanning interferometry (VSI).

Phase-shifting interferometry is based on changing the phase difference between two coherent interfering beams using narrow-band light or a single wavelength, $\lambda$, in some known manner, for example by changing the optical path difference (OPD) either continuously or discretely with time. Several measurements of light intensity with different OPD values, usually equally spaced, at a pixel of a photodetector can be used to determine the phase difference between the interfering beams at the point on a test surface corresponding to that pixel. Based on such measurements at all pixels with coordinates (x,y), a phase map $\Phi(x,y)$ of the test surface can be obtained, from which very accurate data about the surface profile may be calculated using well known algorithms.

PSI provides a vertical resolution on the order of better than $1/100$ of a wavelength; thus, it is well suited for characterizing smooth, well-reflecting surfaces. At the same time, the PSI technique has a limited vertical range of application because of the so-called $2\pi$ ambiguity; i.e., the fact that the phase shift between two beams is repeated with $2\pi$ periods every time the OPD exceeds a distance of $\lambda/2$. This "phase wrapping" behavior of PSI leads to ambiguity in the measurements of the surface profile when the surface features are higher than $\lambda/2$. Thus, in practice, conventional PSI techniques have been limited to measurements of fairly smooth and continuous surfaces because only in such cases can phase-unwrapping algorithms be applied to reconstruct the surface shape.

Large-step, rough, or steep-surface measurements, on the other hand, have been traditionally carried out with white-light (or broadband-light) vertical-scanning interferometry. As conventionally implemented, VSI uses a white-light source and the reference arm of the interferometer is scanned vertically with respect to a stationary test sample (or vice versa). The degree of contrast of fringes produced on the detector by two interfering beams (instead of their phases) is measured as a function of distance between the reference and test surfaces to obtain information about the test surface. The contrast of a VSI interferogram is maximum when the OPD approaches zero and the test surface topography may be reconstructed by determining the peak position of the modulation envelope of the interferogram for each detector pixel. The VSI approach overcomes the limited scanning range associated with PSI techniques, but suffers from significantly lower resolution (about 3 nm) and, therefore, is not as precise as PSI.

Together, PSI and VSI make it possible to measure most samples. However, both are based on having a uniform reflectivity at each region of the sample surface corresponding to each detector pixel. (For convenience, the term pixel is used hereinafter to refer both to a detector pixel and to the corresponding region of the sample surface.)

Multi-material structures, hereinafter referred to as "composite" materials or structures, are necessarily characterized by an optically non-homogeneous surface because of the different optical properties of the materials. In particular, the phase change on reflection (typically referred to as "PCOR" in the art) used for the interferometric measurement of a composite structure may vary from point to point on the test surface depending on the particular composition of the material illuminated by the test beam. When two or more materials are present in a sample pixel, the resulting PCOR is an undefined combination of the PCORs generated by all materials within that pixel and detected at the corresponding detector pixel.

Furthermore, composite structures are typically also characterized by irregular surfaces because of the granularity produced by the interfaces between materials. This structural characteristic is found to be present even when the surface is highly polished. As a result, the single height produced by the interferometric measurement at a given pixel is necessarily incorrect because of the nano-scale non-planar structure of the test surface. Therefore, the interferometric surface characterization of test samples made of dissimilar materials has been problematic.

The problem is particularly significant with regard to the manufacture of read/write magnetic-head sliders, where precise and rapid profilometry is essential for quality control purposes. The precise height of the various slider components is critical to ensure performance and long product life. As illustrated schematically in the top view and cross-section of FIGS. 1(A) and 1(B), respectively, magnetic-head sliders include an air-bearing surface 10 (ABS) made of an aluminum-oxide/titanium-carbide composite material (often referred to as AlTiC), a read/write pole-tip region 12, and a trailing edge surface 14 made of aluminum oxide. The working distance between the air bearing surface of the slider and the disk surface affects the potential for a mechanical crash as the head flies over the disk. Similarly, the distance between the pole tip and the disk affects signal loss during read/write operations.

Therefore, standard tests carried out for quality control during manufacture of head sliders involve the measurement of the difference between the heights of the ABS surface 10 and the trailing edge surface 14 (commonly referred to as the aluminum oxide trailing-edge recession, or ALR, parameter) and of the distance between the heights of the ABS surface 10 and the pole tip 12 (commonly referred to as the pole tip recession, or PTR, parameter). The composite ABS surface 10 is precision polished in order to render it as flat as possible for optimal functionality. Thus, the height of the ABS surface is conveniently identified for the purpose of calculating the ALR and PTR parameters by fitting a plane surface 16 to the height data obtained by means of an interferometric measurement of a predetermined ABS region. However, for the reasons mentioned above, the composite structure and the corresponding granularity of the AltiC material tend to produce imprecise height measurements by conventional interferometry.

Various approaches have been used in the art to overcome this shortcoming of interferometry. For example, one approach has been to determine global refraction indices (n,k) for the ABS region using ellipsometry and to establishes a linear relationship between n and the reflectance R of the ABS surface. A well-known formula relating PCOR to n and R is then used to calculate a single overall PCOR value for the ABS surface, which can be used to correct the inteferometric measurement. See K. H. Womack et al., "IEEE Transactions on Magnetics," Vol. 34, No. 2, March 1998, p. 459.

Another approach is based on the assumption that the effective complex reflectivity, $r_{mix}$, for a mixture of two materials [of composition $\epsilon$ % TiC and $(1-\epsilon)$ % $Al_2O_3$] is given by the linear relationship $r_{mix} = \epsilon\, r_{TiC} + (1-\epsilon) r_{Al2O3}$. Thus, a theoretical value for $r_{mix}$ is simply calculated on the basis of known quantities ($\epsilon$, $r_{TiC}$, and $r_{Al2O3}$). Global refraction indices (n,k) are then generated by ellipsometry and used in an empirical equation to calculate a global PCOR for the ABS region as a function of the assumed effective complex reflectivity and the measured global refraction indices. See Peter de Groot, "Applied Optics," Vol. 37, No. 28, October 1998, p. 6654.

Still another approach is disclosed by Mansfield et al. in U.S. Patent Publication No. 2006/0176522. These authors use an empirical formula for calculating a height correction for the ABS region as a function of the average modulation amplitude over the trailing-edge surface, the local modulation amplitude at the pixel of interest, and several parameters determined empirically. Specifically, one parameter is related to the instrument and is calculated by comparing results obtained from known surfaces; another parameter is calculated so as to minimize roughness from a known set of height data; and two more parameters are selected for numerical and normalization purposes.

None of these methods achieves the degree of accuracy desired for the interferometric measurement of ALR and PTR parameters of magnetic-head sliders. For quality-control purposes, it would be very desirable to achieve an accuracy of about 1 nm RMS or better, but current techniques can do no better than about 3-4 nm RMS. This invention provides a further advance in the art based on a pixel-by-pixel analysis of the composition of the multi-material ABS surface and a calculation of a local correction factor for each pixel height generated by interferometry.

BRIEF SUMMARY OF THE INVENTION

The method of the invention is carried out by performing an initial determination of the surface profile of a composite material, such as the ABS surface of a head slider, using a conventional interferometric method. The composition of the mixture constituting the composite material ($Al_2O_3$ and TiC, for example) is then calculated at every pixel of the surface using an empirical relation between modulation and the absolute value of reflectivity and by assuming a linear relationship between the composite reflectivity of a composite material and the theoretical reflectivity of each constituent.

An absolute value of reflectivity for the composite material is obtained from the empirical relation and the modulation measured while profiling the sample surface. The concentration of each constituent of the composite material is then determined from the absolute value of reflectivity for the composite material and the theoretical values of reflectivity of its constituents using the assumed linear relationship. The linear relationship is then also used to calculate an effective composite (complex) reflectivity for the composite material from the concentration and the theoretical reflectivity of each constituent. The phase change on reflection, $\delta_{ij}$, at each pixel can thus be determined using the conventional theoretical relationship between phase change and reflectivity. Once the PCOR is calculated for each pixel, the initial surface profile is corrected by adding the corresponding fraction of wavelength to the height of each pixel.

In the more specific case of ALR- and PTR-parameter calculation for magnetic-head sliders, the plane surface fitted to the profile of the ABS (AlTic) surface is corrected according to the invention. The recessions between the ABS surface and the aluminum-oxide trailing edge and between the ABS surface and the pole tip can thus be refined using a corrected reference plane calculated from actual reflectance data.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

BRIEF DESCRIPTION OF THE DRAWINGS

FIG. 3 is a flow chart of the broad steps involved in carrying out the invention.

FIG. 4 is a more detailed flow chart of the steps described to carry out the invention.

DETAILED DESCRIPTION OF THE INVENTION

The invention lies in the idea of determining an effective reflectivity at each pixel of a composite sample surface and then calculating a PCOR value for each pixel from its effective reflectivity. As part of the process, an empirical equation is formulated to relate the absolute value of reflectivity for the composite material to the measured modulation produced by an interferometric measurement. The parameters characterizing this equation are determined by way of calibration using interferometric data produced with two surfaces of known optical properties. The composition of the composite material at each pixel is estimated using the local value of absolute reflectivity and assuming a linear relationship between composition and reflectivity. The concentration of each constituent is then used to calculate an effective reflectivity for the composite material at each pixel, from which the corresponding PCOR value may be obtained.

The invention is described throughout for convenience with regard to correcting the ALR and PTR parameters of magnetic-head sliders, but one skilled in the art would readily recognize that the method can be applied in the same general way to correct the interferometric profile of any surface that consists of dissimilar materials, with or without granularity, that produce non-uniform optical properties. As used herein, the terms concentration and composition are used to refer to the relative amounts (or ratios) of the constituent components of the composite material. Inasmuch as these concentrations are denoted in terms of undefined percentages (i.e., $\epsilon$ %), it is understood that they are empirical quantities that do not represent a true composition. Accordingly, the fact that these percentages are not expressed in terms of either weight or volume does not impart any ambiguity to the process of the invention.

Figure 1A:
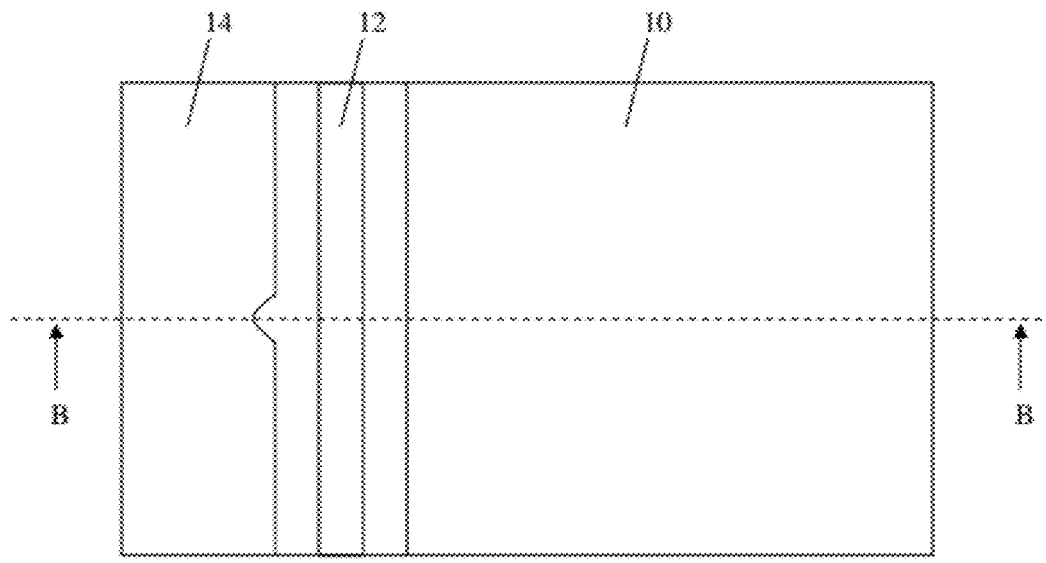
FIG. 1(A) is a schematic plan-view illustration of a magnetic-head slider include an air-bearing surface made of an aluminum-oxide/titanium-carbide composite material, a read/write pole-tip region, and a trailing edge surface made of aluminum oxide.
Figure 1B:
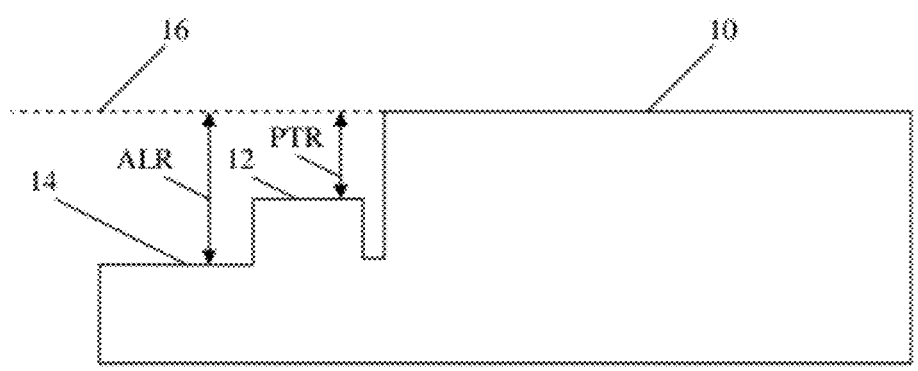
FIG. 1(B) is a cross-sectional view of the head slider of FIG. 1(A) taken along line B-B in that figure to illustrate the physical significance of the ALR and PTR parameters.
Figure 2:
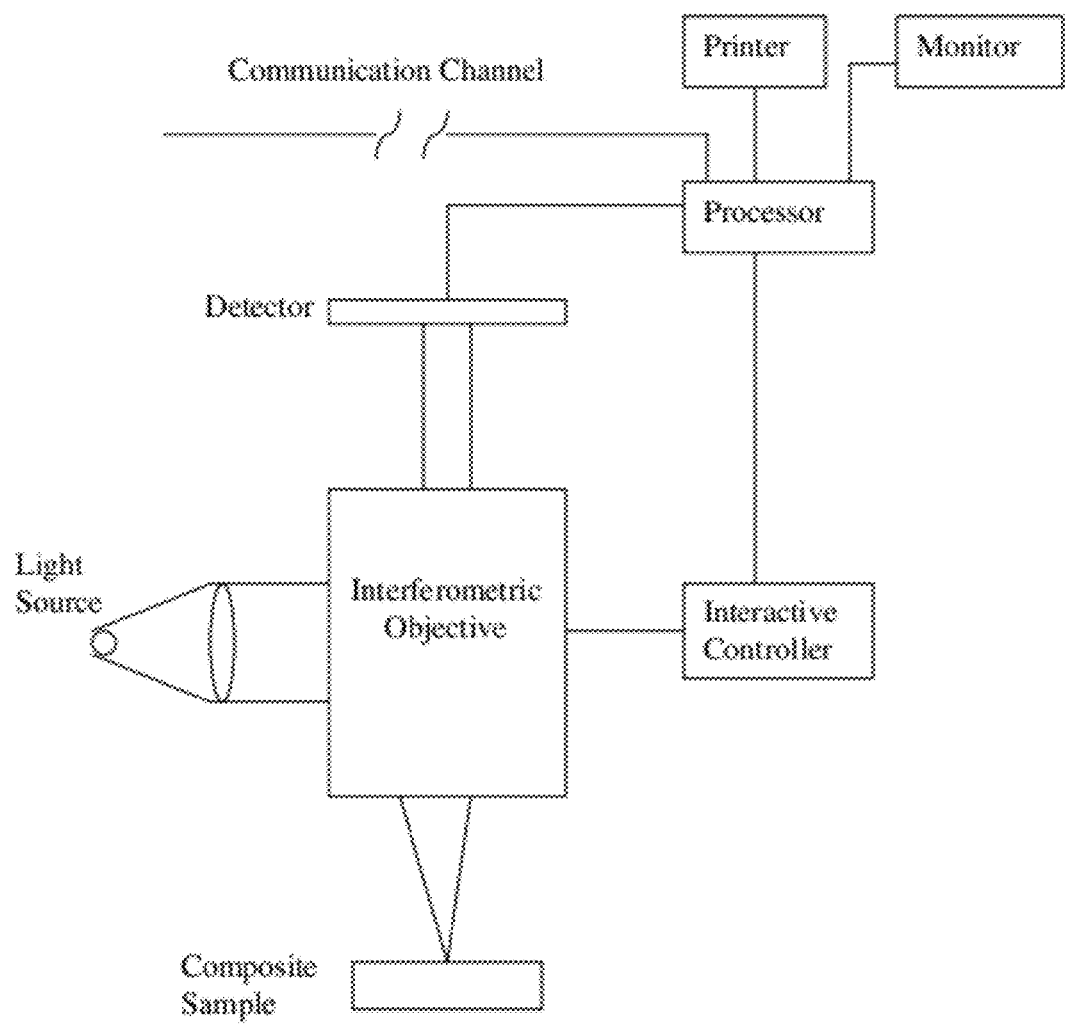
FIG. 2 is schematic representation of an interferometric profiler suitable for practicing the invention.

According to the invention, a conventional interferometric measurement is first carried out to determine phase and corresponding height at each pixel within some portion of the ABS surface, the trailing edge surface, and the pole-tip region. A conventional interferometric profilometer connected to an appropriately programmed computer may be used, as illustrated schematically in FIG. 2. As a result of this measurement, experimental height and modulation values, $H_{ij}^{exp}$ and $M_{ij}^{exp}$, respectively, are available for each pixel of the ABS surface made of composite material (namely Al2O3 and TiC). The following detailed procedure is then undertaken to correct the experimental phase and height initially calculated for the ABS surface.

From theory, is it known that the observed experimental modulation at each pixel is governed by the relationship $$M_{ij}^{exp} = 2I_0 |r_{ref}|°|r_{obj}|-\beta, \quad (1)$$

where $I_0$ is the product of the intensity received by the sample and the reference surface in the areas corresponding to the ij pixel of the detector; $r_{ref}$ and $r_{obj}$ are the reflectivities of the reference and object surfaces used for the interferometric measurement, respectively; and $\beta$ is an empirical parameter that represents modulation losses in the system. According to one aspect of the invention, Equation 1 is written in function only of the absolute value of the reflectivity of the object surface, as follows:

$$M_{ij}^{exp} = \alpha |r_{obj}^{th}| - \beta, \quad (2)$$

where $r_{obj}^{th}$ is the theoretical reflectivity of the composite object surface, and $\alpha$ and $\beta$ are system-dependent parameters.

In order to determine the $\alpha$ and $\beta$ parameters, Equation 2 can be used in straightforward manner in a two-equation system to express the experimental modulation produced by two materials of known theoretical reflectivity [such as the Pole Tip (PT) region and the aluminum (Al) region of the slider], as follows:

$$M_{PT}^{exp} = \alpha |r_{PT}^{th}| - \beta,$$

$$M_{Al}^{exp} = \alpha |r_{Al}^{th}| - \beta. \quad (3)$$

This system of equations (two equations, two unknowns) can thus be solved analytically to calculate $\alpha$ and $\beta$. This approach yields values of $\alpha$ and $\beta$ for each pixel of the region of interest, which could be used as such on a pixel-by-pixel basis to determine correction factors according to the invention. However, global average values used for the entire region have been found to be sufficiently representative to produce good correction results. Therefore, the latter approach is preferred.

Once values for $\alpha$ and $\beta$ are so determined, a value of composite reflectivity for the composite AlTiC surface, $r_{AlTiC}^{comp}$, is determined at every pixel by solving Equation 2, as follows:

$$|r_{AlTiC}^{comp}| = (M_{AlTiC}^{exp} + \beta)/\alpha. \quad (4)$$

The composite reflectivity value obtained from Equation 4 is then used to calculated the composition of the composite material at each pixel by assuming a particular functionality between the composite reflectivity and each of the theoretical reflectivities of the constituents ($Al_2O_3$ and TiC). Based on the proven viability of the linear approach (see above, paragraph 12), the assumption that the composite reflectivity results from a linear contribution of each constituent is preferred, that is, $$r_{AlTiC}^{comp} = \epsilon r_{TiC}^{th} + (1-\epsilon) r_{Al2O3}^{th}. \quad (5)$$

Since the theoretical values of $r_{TiC}^{th}$ and $r_{Al2O3}^{th}$ are known, $\epsilon$ and $1-\epsilon$ (the concentrations of TiC and $Al_2O_3$, respectively) can be calculated using Equation 5.

Because reflectivity is a complex number, the solution of Equation 5 can be carried out by equating the absolute values of the two sides in quadratic form, that is, $$|r_{AlTiC}^{comp}|^2 = |\epsilon r_{TiC}^{th} + (1-\epsilon) r_{Al2O3}^{th}|^2, \quad (6)$$

which, from Equation 4, can also be written as $$|\epsilon r_{TiC}^{th} + (1-\epsilon) r_{Al2O3}^{th}|^2 = [(M^{exp} + \beta)/\alpha]^2. \quad (7)$$

The theoretical value of reflectivity for a given material can be calculated from well-known equations in the art based on each material's indices of refraction, n and k. Therefore, all variables and parameters of Equation 7 are known except for $\epsilon$, which can thus be calculated for every pixel of the ABS surface.

Once the concentrations of TiC and $Al_2O_3$ ($\epsilon$ and $1-\epsilon$, respectively) have been determined for each pixel in the region of interest of the ABS surface, the composition of the composite material is used to calculate an effective composite reflectivity assuming, again, for example, the linear relationship of Equation 5, i.e., $$r_{AlTiC}^{eff} = \epsilon r_{TiC}^{th} + (1-\epsilon) r_{Al2O3}^{th}. \quad (8)$$

The phase change on reflection $\delta$ for the pixel can then be calculated from the ratio of the imaginary and real components of the theoretical, effective reflectivity so obtained, as represented by the well known relationship $$\delta = \arctan [Im(r_{AlTiC}^{eff})/Re(r_{AlTiC}^{eff})]. \quad (9)$$

As a result of this process, the PCOR at each pixel of the AlTiC surface used to calculate the ALR and PTR parameters becomes available to correct the initial AlTiC profile using the conventional relationship between phase and height, $$H'_{ij} = H_{ij} + \lambda \delta_{ij}/4\pi, \quad (10)$$

where i and j denote a particular pixel, $\lambda$ is the effective wavelength used for the interferometric measurement, and $H'_{ij}$ is the corrected height.

Thus, the method of the invention allows the calculation of a correction factor for the interferometric profile of a composite surface based on an empirical combination of experimental and theoretical parameters. The correction is carried out on a pixel-by-pixel basis and produces results that reflect the actual physical structure of the composite material. FIG. 3 illustrates in broad descriptive terms the essential steps required to carry out the invention. FIG. 4 is a flow chart of the more specific steps that can be used to practice the invention, as described above.

Figure 5:
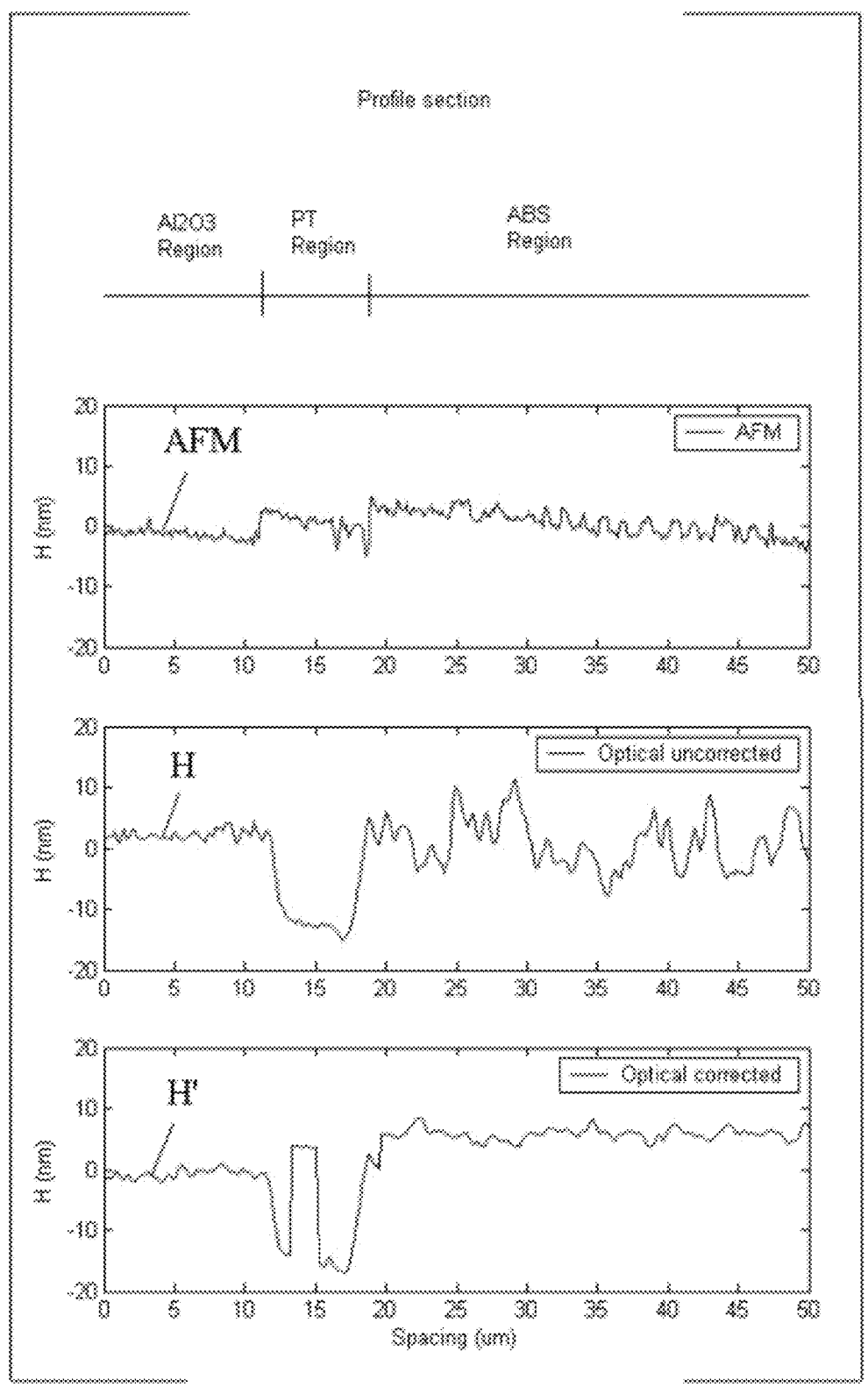
FIG. 5 illustrates the efficacy of the correction method of the invention by comparing the profiles obtained by atomic force microscopy, conventional interferometry, and interferometry corrected according to the invention.

When used to correct the profile of the ABS surface of conventional magnetic-head sliders, the method of the invention, used with some additional conventional low-pass filtering, has been found to repetitively yield surface measurements with a level of precision in the order 0.6 nm RMS or better, which is almost an order of magnitude better than the results produced by the same interferometric measurement when no correction according to the invention is implemented. As a result, the ALR and PTR parameters calculated using the method of the invention are greatly improved. For example, FIG. 5 shows the cross-sectional profile (denoted as AFM) of a typical head slider obtained with an atomic force microscope (taken as the true profile and used for reference for comparison purposes), the corresponding profile H obtained with conventional profilometry, and the corrected profile H' produced by the method of the invention. It is visibly clear that the discrepancy of the uncorrected profile with respect to the AFM reference is in the order of several nanometers. For instance, the average improvement for the PTR region was about 11.5 nm (from −14 nm to −2.5 average discrepancy). In essence, the correction process of the invention produced a profile that is substantially true to the AFM profile. These results have been produced with predictable repetitiveness using different sample materials.

The calculation of the parameters $\alpha$ and $\beta$ has been illustrated in Equation 3 using modulation and reflectivity data for the pole tip region and the aluminum trailing edge surface of the slider. This is convenient in head slider applications because both of these surfaces need to be profiled in order to calculate the PTR and ALR parameters and, therefore, the modulation data produced by interferometry to measure these surfaces are already available and can be used advantageously also for the calculation of $\alpha$ and $\beta$. However, it is understood that any two surfaces can be used for that purpose. An external reference surface that is particularly desirable for its optical properties, for example, may be preferred. In such a case, the relevant equations would become, $$M_{Ref}^{exp} = \alpha |r_{Ref}^{th}| - \beta,$$

$$M_{Al}^{exp} = \alpha |r_{Al}^{th}| - \beta, \tag{11}$$

Magnetic-head sliders are typically coated with a protective diamond-like carbon layer (referred to as a DLC layer in the art). Therefore, all interferometric measurements discussed above are carried out through a thin-film of DLC that has to be accounted for in the calculation of the correction factors of the invention. In particular, the theoretical reflectivities used in the various equations must conform to the multilayer structures being profiled.

Figure 6:
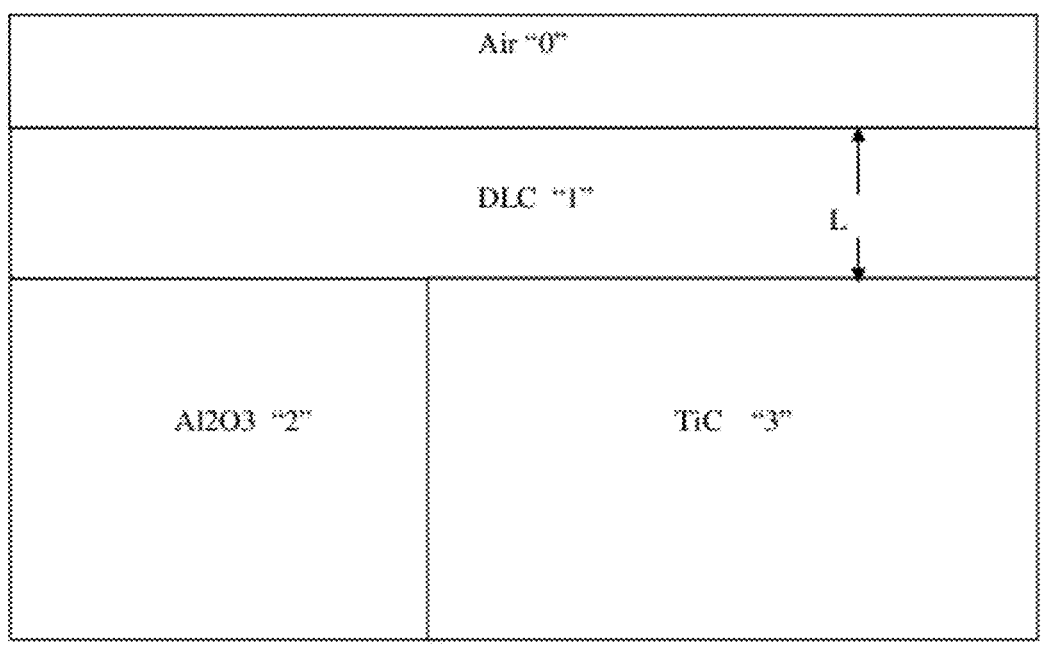
FIG. 6 illustrates schematically an AlTic structure coated with a DLC layer.

Referring to FIG. 6, for example, the coated AlTiC surface may be illustrated as consisting of distinct $Al_2O_3$ and TiC regions coated with a DLC layer of thickness L. Accordingly, as one skilled in the art would readily recognize, the reflectivities of the $DLC/Al_2O_3$ and the DLC/TiC layers can be calculated from the reflectivities of the individual layer constituents from the relations, $$r_{DLC/Al2O3} = \frac{r_{01} + r_{12} * e^{-2i\frac{2\pi}{\lambda}(n_1 - ik_1)L}}{1 + r_{01} * r_{12} * e^{-2i\frac{2\pi}{\lambda}(n_1 - ik_1)L}}, \tag{12}$$

and $$r_{DLC/TiC} = \frac{r_{01} + r_{13} * e^{-2i\frac{2\pi}{\lambda}(n_1 - ik_1)L}}{1 + r_{01} * r_{13} * e^{-2i\frac{2\pi}{\lambda}(n_1 - ik_1)L}}, \tag{13}$$

respectively, where the indices 0, 1, 2 and 3 refer to air, DLC, $Al_2O_3$ and TiC, respectively, and where $$r_{01} = \frac{1 - n_1 + ik_1}{1 + n_1 - ik_1}, \tag{14}$$

$$r_{12} = \frac{n_1 - ik_1 - n_2 + ik_2}{n_1 - ik_1 + n_2 - ik_2}, \tag{15}$$

and $$r_{13} = \frac{n_1 - ik_1 - n_3 + ik_3}{n_1 - ik_1 + n_3 - ik_3}. \tag{16}$$

While the invention has been shown and described herein in what is believed to be the most practical and preferred embodiments, it is recognized that departures can be made therefrom within the scope of the invention. For example, the determination of $\epsilon$ in Equation 7 could be simplified by neglecting the interference effect, which would lead to the simpler equation, $$\epsilon |r_{TiC}^{th}|^2 + (1-\epsilon)|r_{Al2O3}^{th}|^2 = [(M^{exp} + \beta)/\alpha]^2, \tag{17}$$

from which the value of $\epsilon$ can be calculated by solving a single order equation.

Similarly, rather than using Equation 9 to calculate the PCOR at each pixel, the complex quantity $r_{AlTiC}^{eff}$ could be used to find an equivalent n and k for each pixel from the known relation $$r_{AlTiC} = \frac{1 - n + ik}{1 + n - ik}. \tag{18}$$

These values of n and k could then be used to determine a $\delta$ value at each pixel (ij) by using the standard formula:

$$\delta_{ij} = \tan^{-1}\left[\frac{2k}{1 - n^2 - k^2}\right]. \tag{19}$$

Those skilled in the art will readily recognize that the technique of the invention can be used advantageously for various related purposes, such as, for example, determining a local (pixel-by-pixel) effective reflectivity value for a surface made of a composite material. The detailed process outlined below provides such information upon solution of Equation 8. The procedure could similarly be used to calculate a local (pixel-by-pixel) concentration of each constituent of the surface of the composite material. That information becomes available upon solution of Equation 7 or Equation 17 above.

In addition, the invention can be used to provide in situ calibration of the interferometric profilometer used to practice the invention. When the apparatus is used to measure ALR and PTR parameters, modulation data for the trailing-edge surface and the pole-tip region are necessarily produced and stored. Therefore, these data are available for the direct (i.e., in situ) calculation of the empirical system-dependent parameters $\alpha$ and $\beta$ required to carry out the step identified with Equation 2. Accordingly, no further calibration of the apparatus is necessary using reference surfaces and materials that are not already part of the system and samples being tested.

Note also that the invention has been described using a linear relationship between composite reflectivity and theoretical reflectivity of constituents (see Equation 5) because such functionality has proven to be advantageous for the objective of the invention; however, any other empirical or theoretical relationship that produces useful results would be acceptable to practice the invention following the same procedure described herein. Finally, reflectivity is the optical property described for the various steps used to practice invention, but the approach would be equally viable with any optical property affecting PCOR for which an empirical equation relating it to modulation could be written. The same series of steps would lead to the calculation of an effective value for the optical property, which in turn could be used to calculate phase change on reflection. For instance, if a material is partially transmissive, transmissivity and its theoretical relationship to modulation could be used to define a different empirical equation with different parameters that could be determined by solving the equation with information from known materials. Thus, in essence, the important advance of the invention is the idea of determining an effective value at each pixel for an optical property that can be used to calculate the PCOR at that pixel. The details described herein illustrate only some of the various ways in which the invention can be implemented.

Therefore, the invention is not to be limited to the details disclosed herein but is to be accorded the full scope of the claims so as to embrace any and all equivalent processes and products.

The invention claimed is:

1. A method of determining a pixel-by-pixel constituent composition of a composite material with interferometric profilometry, said method comprising the following steps carried out at each of a plurality of pixels of a sample of the composite material:
   measuring an interference signal produced by the sample of said composite material;
   assuming an empirical relationship between a known value of an optical property for a material and an interference signal produced by said material;
   establishing said empirical relationship using interference data produced by materials with known values for said optical property;
   using said empirical relationship to derive a value of said optical property for the composite material;
   further assuming a predetermined relationship between a concentration of each constituent of the composite material and a contribution of said constituent to the optical property of the composite material; and
   calculating said concentration of each constituent at each of said pixels using said predetermined relationship and said value of the optical property for the composite material;
   wherein said measuring step is carried out with an interferometer; and said establishing, using and calculating steps are carried out with a computer.

2. The method of claim 1, wherein said optical property is reflectivity, said predetermined relationship is linear, and said value of the optical property is an absolute value of reflectivity.

3. The method of claim 2, wherein said composite material is made of an aluminum-oxide/titanium-carbide material.

4. A method of determining a pixel-by-pixel value of effective reflectivity of a composite material with interferometric profilometry, said method comprising the following steps carried out at each of a plurality of pixels of a sample of the composite material:
   measuring an interference signal produced by the sample of said composite material;
   assuming an empirical relationship between a known value of reflectivity for a material and an interference signal produced by said material;
   establishing said empirical relationship using interference data produced by materials with known reflectivities;
   using said empirical relationship to derive an absolute value of reflectivity for the composite material;
   further assuming a predetermined relationship between a concentration of each constituent of the composite material and a contribution of said constituent to the reflectivity of the composite material;
   calculating said concentration of each constituent at each of said plurality of pixels using said predetermined relationship and said absolute value of reflectivity for the composite material; and
   deriving said effective value of reflectivity for the composite material from said predetermined relationship and said concentration of each constituent;
   wherein said measuring step is carried out with an interferometer; and said establishing, using, calculating and deriving steps are carried out with a computer.

5. The method of claim 4, wherein said composite material is made of an aluminum-oxide/titanium-carbide material, and said predetermined relationship is linear.

* * * * *